Figure 1:
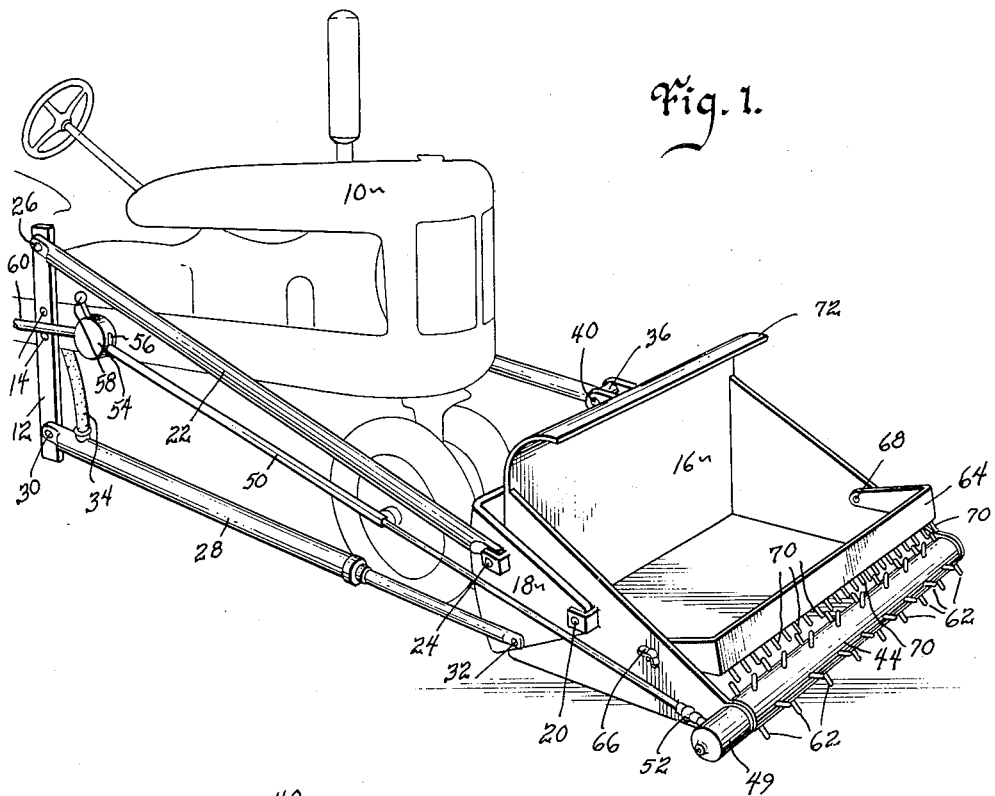

July 17, 1956   D. J. DONAHOE   2,755,092
MATERIAL LOADING, DISPENSING AND SPREADING DEVICE
Filed June 27, 1952   2 Sheets-Sheet 1

Inventor
Donald J. Donahoe
by Talbert Dick & Adler
Attorneys

Witness
Edward P. Seeley

July 17, 1956 D. J. DONAHOE 2,755,092
MATERIAL LOADING, DISPENSING AND SPREADING DEVICE
Filed June 27, 1952 2 Sheets-Sheet 2
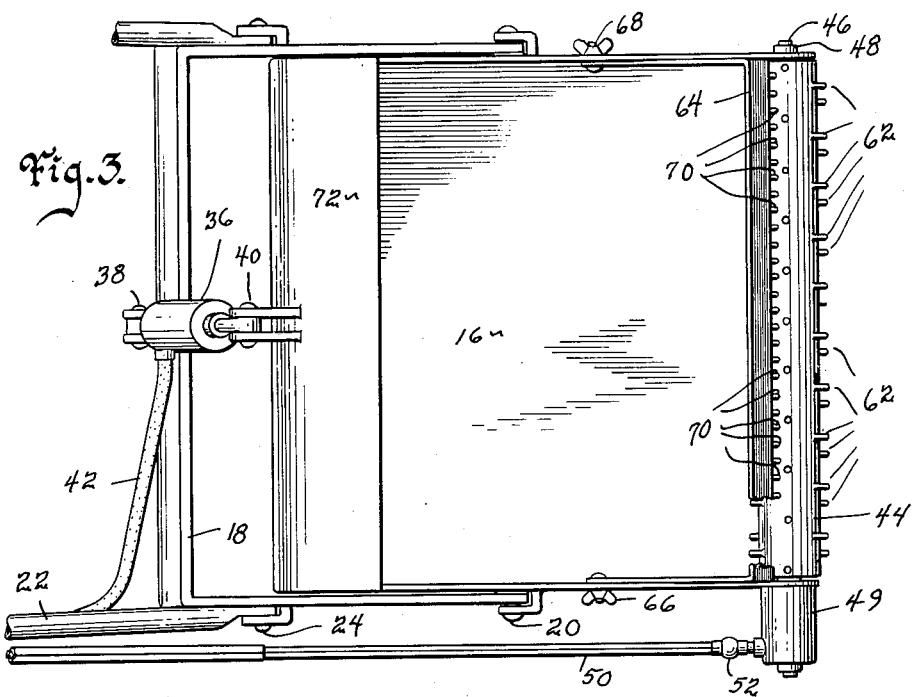
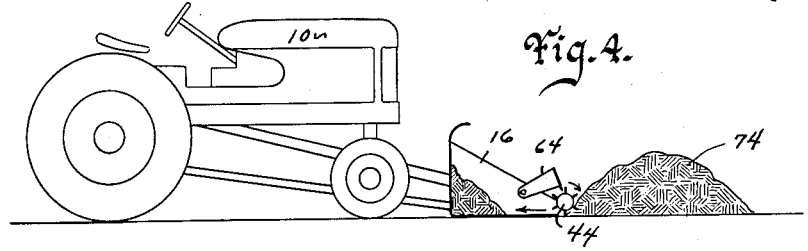
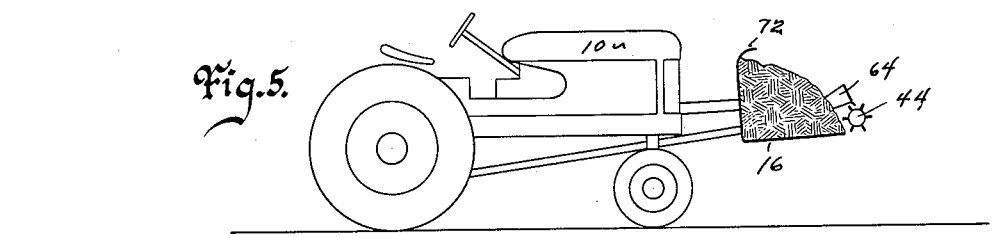
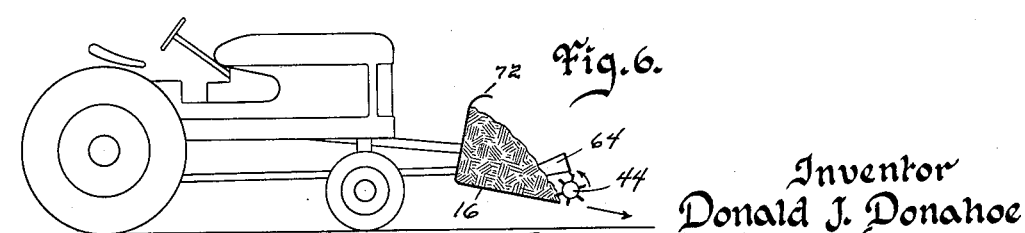
Inventor
Donald J. Donahoe
by Talbert Dick & Adler
Attorneys
Witness
Edward P. Seeley United States Patent Office 2,755,092
Patented July 17, 1956

2,755,092

MATERIAL LOADING, DISPENSING AND SPREADING DEVICE

Donald J. Donahoe, Fort Dodge, Iowa

Application June 27, 1952, Serial No. 296,024

6 Claims. (Cl. 275—1)

This invention is associated with tractor loaders and while it is particularly adapted for moving manure into the shovel of the loader and later dispensing and spreading the same, it may be used successfully with other types of materials.

In modern farming, great difficulty is experienced in spreading manure. The manure spreaders herebefore used cannot be used successfully under present conditions. The reason for this is that in the old method of spreading manure on a field, the farmer used a hand fork to get the manure into the box of the manure spreader. This handling of the manure by a fork full at a time, loosened the manure from its original compact state and the manure spreader was therefore capable of moving the material to the rear of its box and its spreader means adequate in its dispensing and spreading operation. However, today, tractor loaders are used to scoop the manure up and place it in the manure spreader wagon box. These large scoops do not loosen the manure from its compact state, but place the same in large units into the spreader box. The result is that under such conditions, the manure spreader is seriously over-taxed and either fails to function or breaks down.

Therefore, the principal object of my invention is to provide a completely mechanized means for successfully loading, hauling and spreading manure.

A further object of this invention is to provide a manure loading, hauling, dispensing and spreading device that is embodied in one vehicle.

A still further object of my invention is to provide a manure spreader that spreads the material evenly and in loosened and "chopped up" condition as distinguished from the usual lump characteristics herebefore experienced.

A still further object of my device is to save labor, time and costs.

A still further object of this manure equipment is to provide ease of operation and reduce to the minimum the number of times the material is handled from its original state until it is successfully spread over the receiving field.

A still further object of my invention is to provide a manure loader and spreader that is under the adjustment control of the operator at all times.

A still further object of this invention is to provide a manure loader and spreader that is economical in manufacture and durable in use.

These and other objects will be apparent to those skilled in the art.

Figure 2:
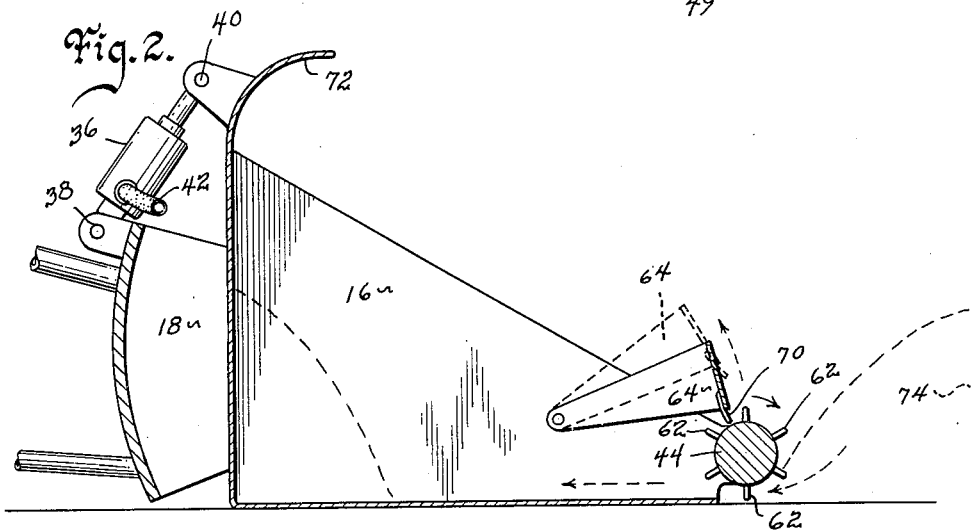

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my material loading, dispensing and spreading device mounted on a fragmentary showing of a tractor. Some conventional portions of the device are eliminated from the drawing to conserve space, Fig. 2 is an enlarged longitudinal sectional view of the bucket. Broken lines illustrate an adjusted position of the cleaning apron and shield and also the movement of material from a similarly indicated pile of material, Fig. 3 is a plan view of the bucket and arms with a portion of the device broken away to more fully illustrate its construction, Fig. 4 is a diagrammatic side elevational view showing on a reduced scale of a tractor equipped with my invention and illustrating how material is loaded, Fig. 5 is a similar view to that shown in Fig. 4 except that the bucket is loaded, and Fig. 6 is a similar view to those shown in Figs. 4 and 5 except that the unloading of the bucket is illustrated.

Referring to the drawings, I have used the numeral 10 to designate an automotive vehicle such as a tractor or the like. A supporting frame 12 is secured to the vehicle 10 in any manner that causes the frame to be stable relative to the vehicle as by the bolts 14 or the like. Only one side of the device is shown in its entirety but it is understood that elements not shown are duplicates of units that are shown or are so well known to not require disclosure in the drawings. The bucket 16 is pivotally supported in the yoke 18 by any suitable means such as pins 20 or the like. The yoke is pivotally connected to the arm 22 as by the pin 24 and the other end of the arm is secured by a similar pin 26 to one end of the frame 12. The extensible arm 28 which is shown as preferably being in the form of a hydraulic cylinder is pivotally secured to the frame 12 at a point that is vertically spaced from the point at which the arm 22 is attached. The pin 30 is a suitable form of making this attachment of the extensible arm 28 to the frame. The other end of the arm 28 is pivotally secured to the yoke as by the pin 32. The structure of the arms 28 and 22 are duplicated on the other side of the unit. A hose 34 supplies arm 28 with hydraulic fluid by way of any appropriate and well known control valve and the tractor hydraulic system.

The attitude of the bucket relative to the yoke is determined by the hydraulic cylinder 36 which constitutes a variable length connector between the yoke and the bucket. This cylinder is pivotally secured to the yoke as indicated at 38 and similarly secured to the bucket 16 as indicated at 40. A conduit designated 42 is of any appropriate type to supply hydraulic pressure to cylinder 36. The conduit is connected through any suitable well known control valve to the hydraulic system of the vehicle. By means of hydraulic cylinder 36, obviously, the attitude of the bucket relative to the yoke may be controlled.

The bucket itself constitutes the most novel portion of my device. At its leading edge it is provided with a cylinder 44 that is rotatably secured to the bucket in any suitable manner as by the stub shaft 46 in the journal 48 and by a longer stub shaft on the other side that extends into gear box 49. Appropriate conventional gears in the box connect the cylinder to the telescoping drive shaft 50 through the conventional covered universal joint 52. The rear end of shaft 50 enters the reversing gear box 54 through the slot 56 which allows for lifting movement of the bucket. A lever 58 permits manual control over the direction of rotation of the cylinder via the shaft. The reversing mechanism may be any conventional simple form such as the type that introduces an idler gear into the gear train.

The shaft 60 connects the reversing gear box to the power take-off on the rear of the tractor through additional and traditional gearing and shafting. The cylinder is provided with a plurality of rake-like teeth or tines 62. A cleaning apron and shield 64 is pivotally secured to the bucket as at 66 and 68. The apron is provided with a plurality of teeth 70 so spaced and arranged as to pass between the teeth on the cylinder 44. Raising and lowering of the apron is accomplished by the operator by manually moving the apron. The apron may be clamped in one position by tightening the wing nuts one of which is shown at 66. Obviously, the means for lowering or raising the apron to the most efficient or desirable position may be accomplished by any suitable mechanical or hydraulic mechanism. At the rear of the bucket is a shield designated 72 to insure that material being loaded or dispensed does not get thrown rearwardly.

The use of my device is next described, its structure having been recited. As shown in Fig. 4, the scoop or bucket is lowered to the ground and cylinder 44 is rotated in a clockwise direction as viewed in that figure. Such action of the cylinder rakes material into the bucket and shreds it into fine particles at the same time. The tractor 10 is driven forward into the pile 74 as material within reach of the teeth on the cylinder is exhausted. When the scoop is loaded, the vehicle is driven directly to the place where the material is to be spread. The bucket is kept tipped back during this movement as shown in Fig. 5. When the place of dispersal is reached, the cylinder 36 is actuated to tip the bucket 16 down as shown in Fig. 6. The cylinder is then rotated in the opposite direction or counterclockwise as shown in Fig. 6 and material is thrown out upon the ground as indicated by the solid line straight arrow in that figure. The cylinder reshreds and disseminates the material as it is exhausted onto the ground. My device, therefore, provides a double shredding action, shredding it both as it is picked up and as it is spread. Because the material is fluffed as it is placed in the bucket, it is practical to have a very large scoop similar to those used for snow removal and the like. The scoop load is substantially equal to or may be practically as large as that carried by a spreader of the conventional type that is towed behind a vehicle. Also, of course, this unit makes it possible to spread materials in corners and the like which are hard to reach with the conventional towed spreader. Also, the shredded and fluffed character of the material as it is deposited in the bucket avoids the difficulty of packing that is experienced with a loader that is not equipped with my cylinder mechanism. The cleaning apron keeps the cylinder teeth from clogging and also serves to prevent excessive quantities of material from reaching the cylinder when dispersing is being done by acting as a baffle.

Furthermore, when my invention is used, the conventional spreader may be dispensed with altogether. Obviously, my invention saves much labor in that the multiple handling of material is avoided. Also, the simplicity of my device makes it relatively inexpensive to manufacture and maintain.

Some changes may be made in the construction and arrangement of my material loading, dispensing and spreading device without departing from the real spirit and purpose of my invention, and it is my intention to cover by my claims, any modified forms of structure or use of mechanical equivalents which may be reasonably included within their scope.

I claim:

1. In combination with an automotive vehicle having forwardly extending powered lifting arms secured thereto, a forwardly opening yoke secured at its sides to said powered lifting arms, a bucket hingedly secured in said yoke, a powered extensible element having one end connected to said yoke and its other end connected to said bucket at a point spaced from said point of hinged attachment of said bucket to said yoke, an elongated toothed element rotatably secured to the front of said bucket, and an extensible and vertically shiftable vehicle-supported shaft means for rotating said elongated toothed element.

2. In combination with an automotive vehicle frame having powered lifting arms secured thereto and extending beyond one end of said frame, an outwardly opening yoke having its sides secured to said powered lifting arms, a bucket having its rear end hingedly secured within said yoke, a powered extensible element having one end connected to said yoke and its other end connected to said bucket at a point spaced from said point of hinged attachment of said bucket to said yoke, an elongated toothed element rotatably secured to the front of said bucket, an elongated toothed element hingedly secured to said bucket near said elongated toothed rotatable element, and an extensible and vertically shiftable vehicle-supported shaft means for rotating said elongated toothed element.

3. In combination with a powered vehicle mounted loader having a vertically shiftable bucket, a gathering, shredding and spreading device secured to the forward end of said bucket, said device comprising, a cylinder rotatably secured to the front of said bucket, a plurality of teeth secured to said cylinder, and a telescoping shaft means connecting said cylinder to a source of power on said powered vehicle, said source of power including a vehicle-supported and driven gear box, and said telescoping shaft means and gear box having means admitting of vertical swinging movement.

4. The combination set forth in claim 3, and wherein said loader comprises a bucket open at its front and top and having rear and side walls, a forwardly opening yoke within which the rear portion of said bucket is horizontally pivoted, yoke carried means for controlling the position of said bucket and connected to the latter, and vehicle-supported elevating and lowering means for said yoke.

5. In combination with a powered vehicle mounted loader having a bucket, power operated vehicle-carried supporting and elevating means for said bucket and including vertically spaced bars, one of said bars comprising extensible power controlled sections, a gathering, shredding and spreading device secured to the forward of said bucket, said device comprising a cylinder rotatably secured to the front of said bucket, a plurality of teeth secured to said cylinder, a cleaning apron hingedly secured to said bucket near said cylinder, means secured to said apron to limit its swinging movement at will, a plurality of teeth secured to said apron and spaced on said apron so as to avoid the teeth on said cylinder; whereby said teeth on said cylinder are cleaned by passing between teeth on said apron, means at one side of the vehicle for rotating said cylinder, said means including a drive shaft having extensibly connected sections and a vehicle-carried gear-box-incorporating drive means for said shaft, and said gear box having a vertical slot through which said cylinder drive shaft extends and works when the bucket is elevated or lowered.

6. The combination set forth in claim 5, and said gear box having manually controlled reversible drive means for said cylinder drive shaft, which is between said bars.

References Cited in the file of this patent

UNITED STATES PATENTS

| 1,441,128 | Sloat | Jan. 2, 1923 |
| 1,463,492 | Varland | July 31, 1923 |
| 1,508,716 | Ochs | Sept. 16, 1924 |
| 1,790,730 | Snyck | Feb. 3, 1931 |
| 1,898,318 | Smith | Feb. 21, 1933 |
| 1,979,945 | Kranick | Nov. 6, 1934 |
| 2,368,331 | Seaman | Jan. 30, 1945 |
| 2,451,101 | Leschinsky | Oct. 12, 1948 |
| 2,525,870 | Crofoot | Oct. 17, 1950 |
| 2,635,884 | Christiansen | Apr. 21, 1953 |